（12）United States Patent
Brown et al.

(10) Patent No.: US 8,079,226 B2
(45) Date of Patent: Dec. 20, 2011

(54) METHOD FOR ACCURATELY RECHARGING A/C SYSTEMS

(75) Inventors: William Brown, Owatonna, MN (US); Mark McMasters, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 607 days.

(21) Appl. No.: 11/962,024

(22) Filed: Dec. 20, 2007

(65) Prior Publication Data

US 2009/0158756 A1   Jun. 25, 2009

(51) Int. Cl.
    F25B 45/00   (2006.01)
(52) U.S. Cl. .......................................................... 62/149
(58) Field of Classification Search .............. 62/77, 149, 62/292
    See application file for complete search history.

(56) References Cited

U.S. PATENT DOCUMENTS

| 4,441,330 A | * | 4/1984 | Lower et al. ..................... 62/149 |
| 5,758,506 A | * | 6/1998 | Hancock et al. ................... 62/77 |
| 5,875,638 A | * | 3/1999 | Tinsler ............................. 62/149 |
| 6,134,896 A | | 10/2000 | Brown et al. |
| 2005/0097904 A1 | * | 5/2005 | Lifson et al. ..................... 62/149 |

* cited by examiner

*Primary Examiner* — Melvin Jones
(74) *Attorney, Agent, or Firm* — Baker & Hostetler LLP

(57) ABSTRACT

A refrigerant recovery unit for accurately filling a refrigerant system with a refrigerant is provided which includes a storage vessel for holding refrigerant, sensors to assist in determining the pressure of the refrigerant in the storage vessel, a controller to control the flow of refrigerant from the storage vessel to the refrigerant system to be serviced, and a heating device to heat the refrigerant, which is activated only if heating is required, as determined by data received by the controller.

5 Claims, 7 Drawing Sheets

US 8,079,226 B2

METHOD FOR ACCURATELY RECHARGING A/C SYSTEMS

FIELD OF THE INVENTION

The disclosure generally relates to automotive vehicle air conditioning systems, and more particularly to filling the air conditioning system with refrigerant with improved charge accuracy.

BACKGROUND OF THE INVENTION

Automotive vehicle air conditioning (A/C) systems require maintenance. Maintenance includes refrigerant recovery, evacuation, and recharging of the A/C system. Portable refrigerant recovery units are used in connection with this maintenance. The refrigerant recovery units connect to the A/C system of the automotive vehicle to recover refrigerant out of the system, separate out contaminants and oil, and recharge the system with additional refrigerant. As the automotive vehicle A/C systems decrease in size, it is increasingly important to recharge or refill the refrigerant systems with an accurate amount of refrigerant by weight.

SUMMARY OF THE INVENTION

At least one embodiment of the invention is a refrigerant recovery unit for accurately filling a refrigerant system (for example an A/C system) with a refrigerant. The unit includes a storage vessel constructed and arranged to hold refrigerant; a fluid communication means in fluid communication with the storage vessel and connected to the refrigerant system to enable refrigerant to flow between the storage vessel and the refrigerant system; a means for determining a condition of the refrigerant in the storage vessel; a controller operatively connected to the means for determining a condition of the refrigerant to receive data communication therefrom and to the fluid communication means to control a flow of the refrigerant from said storage vessel to the refrigerant system in response to the data received from said means for determining a condition of the refrigerant; and a heating device operatively coupled to the storage vessel and in communication with the controller constructed and arranged to heat the refrigerant.

Other embodiments provide a method for accurately filling a refrigerant system utilizing a supply of refrigerant in a storage vessel of a refrigerant recovery unit in which the method includes measuring an ambient temperature; measuring a temperature of the supply of refrigerant in the storage vessel; determining a temperature difference between the ambient temperature and the temperature of the supply of refrigerant; and heating the supply of refrigerant if the temperature difference is less than a predetermined level.

Still other embodiments show a method for accurately filling a refrigerant system utilizing a supply of refrigerant in a storage vessel of a refrigerant recovery unit in which the method includes measuring an ambient temperature; calculating a value of a refrigerant pressure using the measured ambient temperature; measuring an actual refrigerant pressure of the supply of refrigerant in the storage vessel; determining a pressure difference between the measured refrigerant pressure and the calculated refrigerant pressure; and heating the supply of refrigerant if the pressure difference is less than a predetermined level.

Some embodiments show method for accurately filling a refrigerant system utilizing a supply of refrigerant in a storage vessel of a refrigerant recovery unit in which the method includes determining when the refrigerant recovery unit has been turned on; determining if refrigerant has been recovered from the refrigerant system; determining if the refrigerant has been recovered since the refrigerant recovery unit has been turned on; and transferring fluid from the storage vessel to the refrigerant system if the refrigerant has been recovered from the refrigerant system since the refrigerant recovery unit has been turned on.

Still other embodiments show a method for accurately filling a refrigerant system utilizing a supply of refrigerant in a storage vessel of a refrigerant recovery unit in which the method includes determining when the refrigerant recovery unit is turned on; determining if the refrigerant has been recovered from the refrigerant system since the refrigerant recovery unit has been turned on; determining an elapsed time since the refrigerant was last recovered; and transferring refrigerant from the storage vessel to the refrigerant system if the elapsed time is less than a predetermined amount of time.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
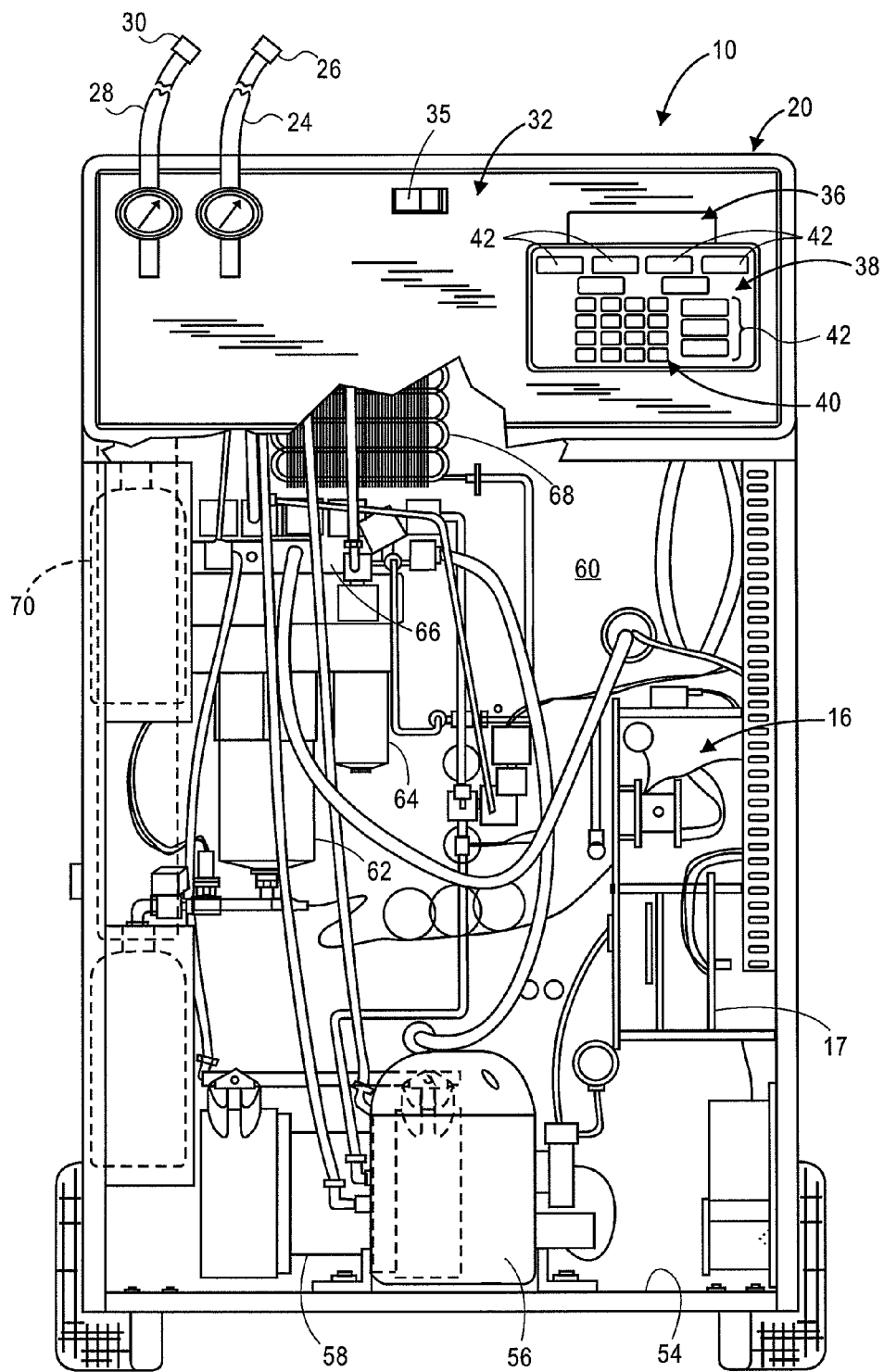
FIG. 1 is a fragmentary front plan view of an example refrigerant recovery unit shown with a portion of the front cover removed to illustrate major components of the unit.
Figure 2:
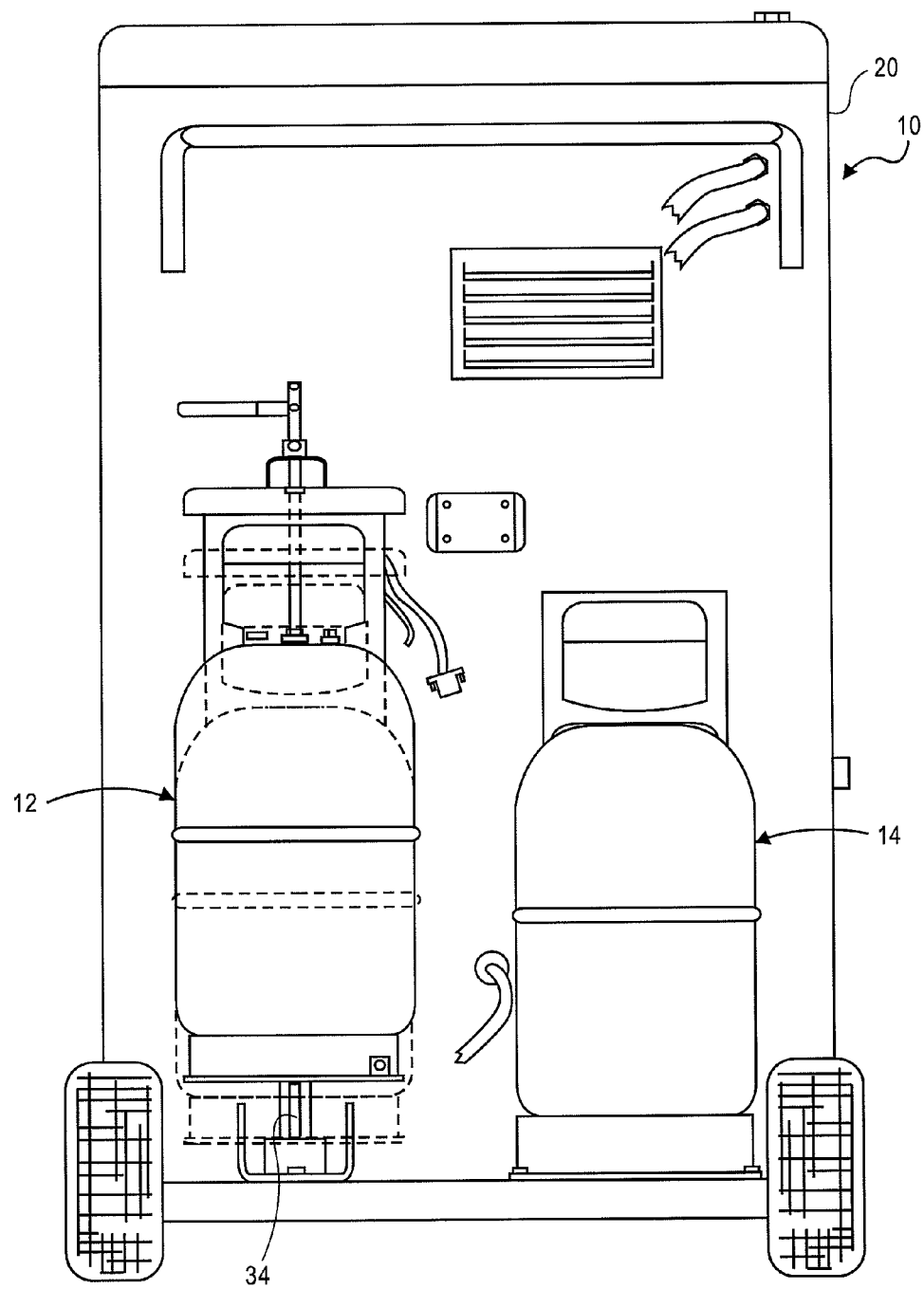
FIG. 2 is a fragmentary rear plan view of the refrigerant recovery unit shown in FIG. 1.

The invention will now be described with reference to the drawing figures, in which like numerals refer to like parts throughout. FIGS. 1-2 shows a portable recovery unit 10 for recovering and recycling refrigerant from a refrigerant system, such as in an automotive vehicle. The unit 10 includes a first container or main tank 12 for holding a primary supply of refrigerant or recovered refrigerant that has been recovered from the A/C system. The main tank 12 may also be referred to as an internal storage vessel (ISV), and is the primary supply of refrigerant. The unit 10 also includes a second container or auxiliary tank 14 for holding a secondary supply of refrigerant. The secondary supply of refrigerant has a known chemical composition, and is sometimes referred to as fresh refrigerant, virgin refrigerant or recharging refrigerant. The auxiliary tank 14 is arranged in fluid communication with the main tank 12 so fluid can be transferred from the auxiliary tank 14 to the main tank 12. An electronic controller means in the form of an electronic controller 16 for controlling the transfer of fluid from the auxiliary tank 14 to the main tank 12 is provided.

Details of the structure and operation of the example embodiment of a refrigerant recovery unit 10 is illustrated in several of the figures. FIG. 1 shows one example of a refrigerant recovery unit 10 for servicing a refrigerant system of a vehicle air conditioning system. The front panel of a cabinet 20 is shown broken away in FIG. 1 to show the major elements of the refrigerant recovery unit 10. Behind the front panel of cabinet 20 is mounted the main tank 12 of refrigerant (FIG. 3) for supplying refrigerant to the system being serviced. Also mounted adjacent the main tank 12 is the auxiliary supply tank 14 which supplies the additional refrigerant to the main tank 12. Mounted to the floor 54 of cabinet 20 is a compressor 56 and a vacuum pump 58. Mounted to the inside of rear wall 60 of cabinet 20 is an oil accumulator tank 62, a compressor oil separator filter 64, a manifold 66 (shown as a node in FIG. 2), and a condenser 68. In addition, a fresh oil canister 70 is mounted within a side compartment of cabinet 20. A recovery oil container 72 is mounted on the lower part of the cabinet 20 to receive oil drained from the accumulator tank 62.

Figure 3:
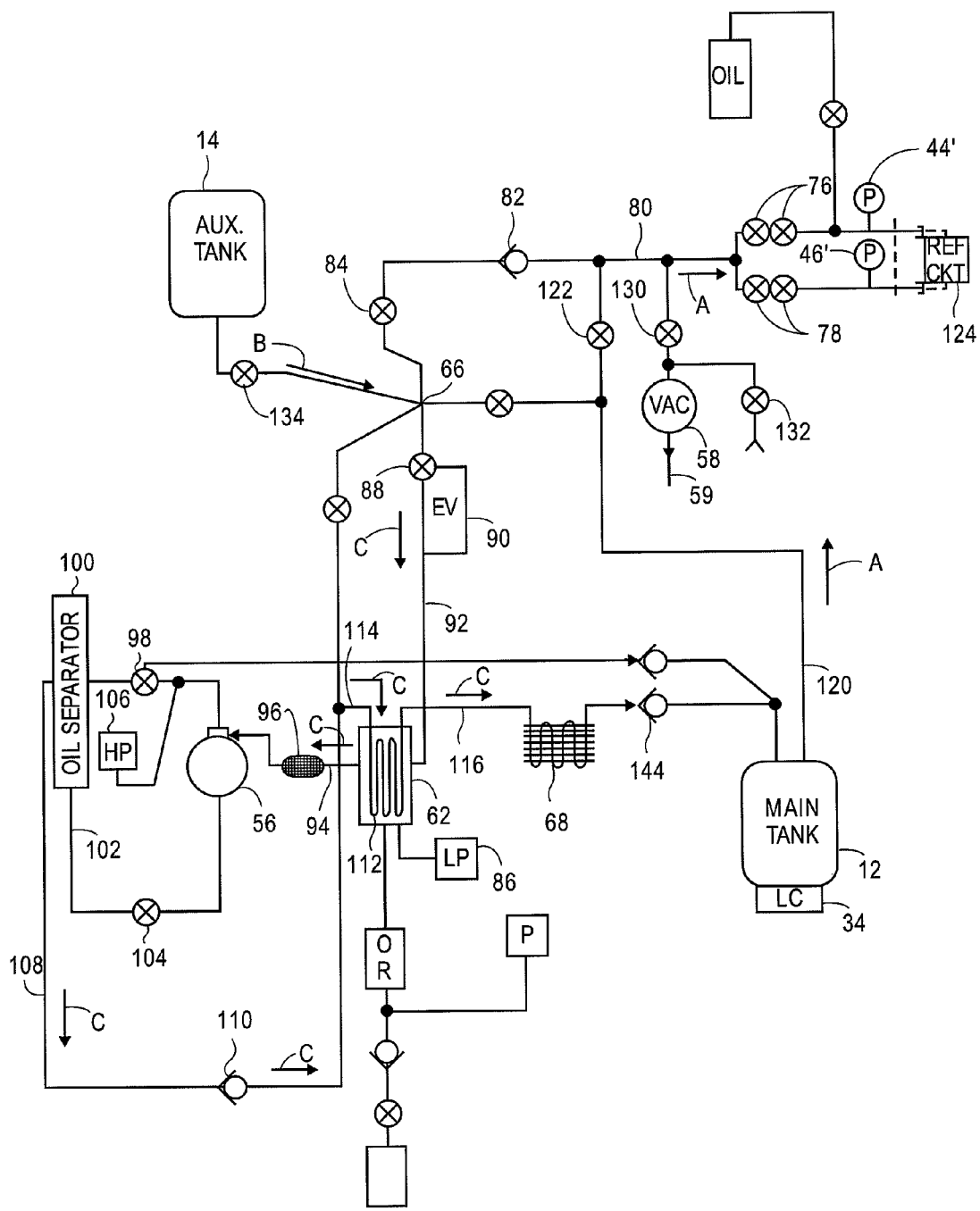
FIG. 3 is a flow diagram of the refrigerant recovery unit shown in FIGS. 1 and 2.

The main tank 12 rests on the weighing device 34, which in this example is load cell, as shown in FIG. 2. The weighing device 34 provides a weight data signal to the controller 16 such that the weight of the tank comprising its tare weight plus the weight of refrigerant therein is monitored by the controller 16. High pressure hoses and connectors together with control valves couple tank 14 to tank 12. In addition, the refrigerant recovery unit 10 may include a high pressure hose 24, typically color coded red, with a coupling 26 for coupling to the vehicle's high pressure port and a low pressure hose 28, typically color coded blue, having a coupling 30 for coupling to the low pressure port of the vehicle's refrigerant circuit. Electrical pressure transducers 44' and 46' (shown in FIG. 3) are coupled to the hoses 24 and 28, and are coupled to the controller 16 through conventional input/output circuits to provide the controller 16 with pressure information during operation of the unit 10. The refrigerant recovery unit 10 includes the electronic controller 16 which includes a microprocessor on a circuit board 17, for controlling an electromechanical solenoid valve 134 (FIG. 3). The microprocessor may be configured with internal memory to store and record data. Optionally, the microprocessor may be configured with an external memory unit to store software and data, and the microprocessor may be coupled to the memory unit for executing the software stored in the memory unit. The external memory unit may be contained within the cabinet 20 or external to it. The electronic controller receives data signals from sensors, including pressure and temperature sensors (FIGS. 4 and 5), controls switches, such as the on and off switch 35 on the control panel 32 shown in FIG. 1, and weighing device 34. The weighing device is the example embodiment is a load cell, but the weighing device can be an electronic scale or any other type of weighing device configurable to transmit a weight data signal to the controller 16.

The control panel 32 includes a display 36 for displaying the operational status of the unit's operation. The display is coupled to the controller 16 by way of a conventional input/output circuit. The control panel 32 further includes a switch panel 38 having a conventional keyboard 40, and a plurality of push-button switches 42 for controlling the operation of the unit 10 through its various phases of operation and/or for selecting parameters for display.

Having briefly described the major components of the refrigerant recovery unit 10 shown in FIGS. 1 and 2, a more detailed description of the operation of the system is described in connection with FIG. 3.

The recovery cycle is initiated by connecting hoses 24 and 28 to the vehicle to be serviced and opening of the dual back-to-back high pressure and low pressure solenoids 76, 78, respectively (FIG. 3). This allows the refrigerant within the vehicle to flow through a conduit 80, through a check valve 82, then through recovery valve 84, and into a manifold 66. The refrigerant then flows through a valve 88 and a unit 90 via conduit 92 into the accumulator tank 62 where it then travels through an output conduit 94 through a water separating molecular sieve 96 and then to the input of the compressor 56. Refrigerant is drawn through the compressor 56 through a valve 98 and through an oil separating filter 100, which circulates oil back to the compressor 56, through conduit 102, and oil return valve 104. The refrigerant recovery unit 10 may optionally include a high pressure switch 106. High pressure switch 106 is coupled to the microprocessor programmed to determine if the upper pressure limit of, for example, 435 psi has been reached in order to shut down the compressor 56 in the event the pressure becomes excessive. The compressed refrigerant then exits the oil separator 100 through a conduit 108, travels through a check valve 110 and then through a heating coil 112 in the accumulator tank 62 via a conduit 114. The refrigerant recovery unit 10 optionally includes a low pressure switch 86 that senses the pressure and provides an output signal coupled to the microprocessor through a suitable interface circuit. The controller 16 is programmed to detect when the pressure has recovered refrigerant down to 13 inches of mercury in the vehicle's A/C system. The heated compressed refrigerant flowing through heating coil 112 assists in maintaining the temperature in accumulator tank 62 within a working range. The refrigerant then flows through a conduit 116 to the condenser 68 which cools the compressed refrigerant which then flows through a check valve 144 and into the main tank 12.

The evacuation cycle begins by the opening of solenoids 76 and 78 and valve 130, leading to the input of vacuum pump 58. Prior to opening valve 130, air intake valve 132 is opened, allowing the vacuum pump 58 to start exhausting air through outlet 59. The vehicle refrigerant system 124 is then evacuated by the closing of valve 132 and the opening of valve 130, allowing the vacuum pump 58 to exhaust any trace gases remaining until the pressure in the system is approximately 29 inches of mercury. When this occurs, as detected by pressure transducers 44' and 46' coupled to the controller 16, the controller 16 actuates valve 130 by turning it off and the recharging cycle begins.

The flow path of the recharging cycle is through an opened charge valve 122 and solenoids 76 to allow the liquid refrigerant in tank 12, which is at approximately 70 psi or above, to flow through conduit 80 to the refrigerant system 124. The flow of refrigerant through high-pressure solenoids 76 is for a predetermined period of time to provide a full charge of refrigerant to the vehicle. The components comprising the recharging cycle flow path are an example of a fluid communication means in fluid communication with the main tank 12 and configured to be connected to the refrigerant system 124 of the vehicle to enable refrigerant to flow between the main tank 12 and the refrigerant system 124.

Having described the main operations of the refrigerant recovery unit, the specific structure and operation of the system to accurately recharge a refrigerant system 124 in accordance with embodiments of the invention will now be described.

Figure 4:
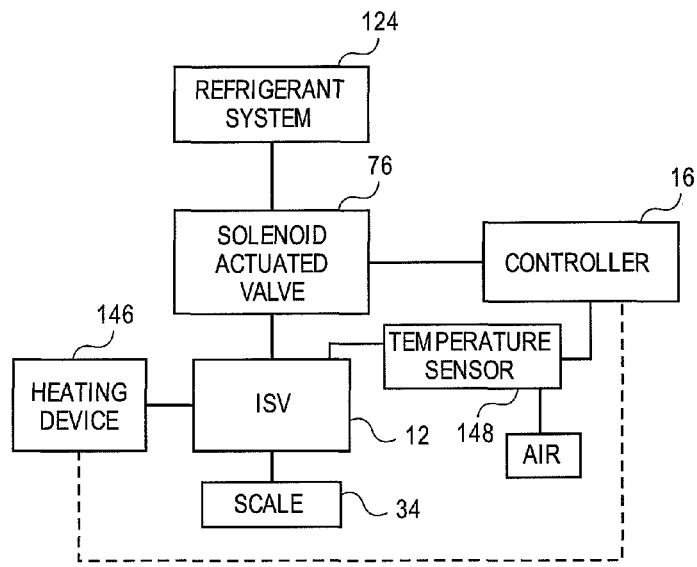
FIG. 4 is an example embodiment of a schematic diagram of a portion of a refrigerant recovery unit showing a temperature sensor coupled to the main tank and to the controller and a heating device coupled to the main tank.

FIG. 4 shows an example embodiment of a schematic diagram of a portion of a refrigerant recovery unit connected to a refrigerant system 124 for accurately filling the refrigerant system 124. A temperature sensor 148 is optionally coupled to the main tank 12 and to the controller 16. A heating device 146 is coupled to the main tank 12 and is directly or indirectly in communication with or controlled by the controller 16. The main tank 12 is positioned on the scale 34 and is connected through a connector or other arrangement of fluid conducting devices to a solenoid actuated valve 76 and through another connector to the refrigerant system 124. The connector can comprise a wide range of structures including plumbing connections, piping, tubing, manifolds, and valves to start and stop the fluid flow, or any other fluid connection structures which allow the refrigerant recovery unit to be connected and disconnected to the refrigerant system 124 and to recycle, recover and recharge the refrigerant. The solenoid actuated valve 76 is operatively coupled to the controller 16.

The temperature sensor 148 measures the refrigerant temperature in main tank 12 and the ambient temperature. The temperature sensor 148 outputs the temperature information via a temperature data signal to the controller 16 through known connections. The controller 16 receives the temperature data signals, processes the signals and determines whether the refrigerant in the main tank 12 requires conditioning. If the controller 16 determines that conditioning is required, the controller 16 acts to control heating of the refrigerant in the main tank 12 with the heating device 146. The controller 16 is also connected to the solenoid actuated valve 76, and sends signals to the valve 76 to open and close. The opening and closing of the valve 76 allows refrigerant to be recovered from the refrigerant system 124 or to flow to the refrigerant system 124 during recharging. The scale 34 weighs the amount of refrigerant in the main tank 12.

Figure 5:
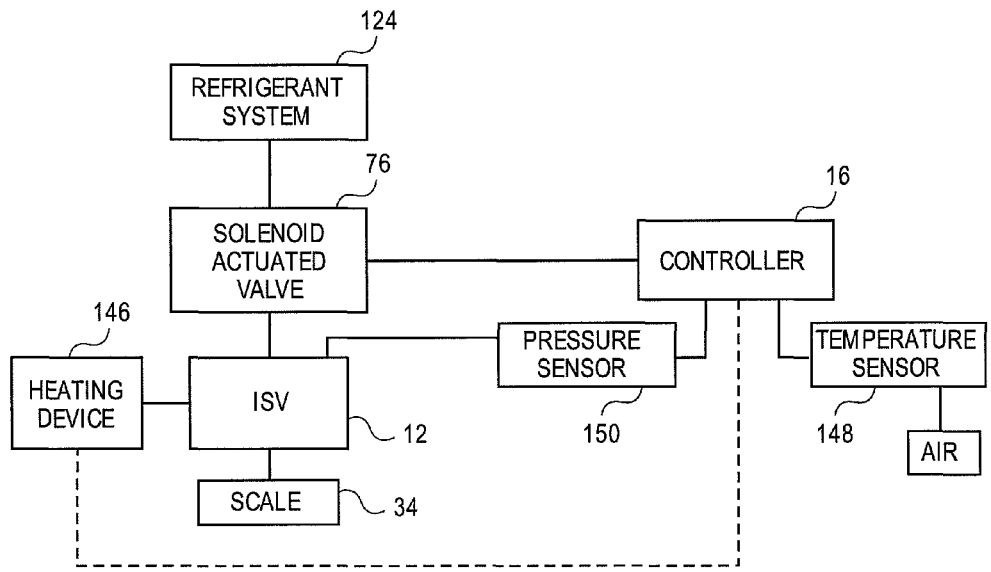
FIG. 5. is another example of a schematic diagram of a portion of a refrigerant recovery unit showing a pressure sensor coupled between the main tank and the controller, a temperature sensor coupled to the controller and a heating device coupled to the main tank.

FIG. 5 shows another example of a schematic diagram of a portion of a refrigerant recovery unit connected to a refrigerant system 124 for accurately filling the refrigerant system 124. The pressure sensor 150 is optionally coupled to the main tank 12 and to the controller 16. The temperature sensor 148 is also optionally coupled to the controller 16. The heating device 146 is coupled to the main tank 12 and is directly or indirectly in communication with the controller 16. The main tank 12 is positioned on the scale 34 and is connected with a plumbing connection to a solenoid actuated valve 76 and to the refrigerant system 124. The solenoid actuated valve 76 is operatively coupled to the controller 16.

The operation of the embodiment shown in FIG. 5 is similar to FIG. 4 except that the controller 16 receives signals from both the temperature sensor 148 and the pressure sensor 150. The temperature sensor 148 measures the ambient temperature, and outputs the ambient temperature information via a temperature data signal to the controller 16. The pressure sensor 150 outputs the pressure of the refrigerant in the main tank 12 to the controller 16 via a pressure data signal. The controller 16 receives the temperature data signal and the pressure data signal and processes these signals determine whether the refrigerant in the main tank 12 requires conditioning.

The current method of filling a refrigerant system 124 with refrigerant is to control a valve between the main tank 12 and the system 124 to be charged. With this method, however, the actual amount of refrigerant, measured by weight, refilled into the refrigerant system 124 can vary with the pressure differential between refrigerant in the main tank 12 and the system 124 to be charged. As refrigerant systems, such as air conditioning systems in automotive vehicles decrease in size, it is increasingly important to recharge or refill the refrigerant system with an accurate amount of refrigerant by weight. For example, if a refrigerant system 124 holds only one pound or less of refrigerant, overfilling or underfilling by several ounces makes a significant difference with respect to the operating pressures and hence efficiency of the refrigerant system 124 being serviced.

Charge accuracy is greatly improved when there is a consistent pressure differential between the main tank 12 and the system to be charged, because the refrigerant will flow at a consistent and predictable rate. In accordance with embodiments of the invention described below, the pressure of the refrigerant in the main tank 12 is increased (or conditioned) only when it is required, thereby achieving a more consistent pressure. Consequently, the variance in the charge accuracy over time becomes smaller and more predictable.

The normal recovery process before charging is usually enough to condition or heat the refrigerant in the main tank 12, because the refrigerant flows through a compressor as part of the recovery process which acts to impart heat to the refrigerant in the main tank 12, thereby raising the refrigerant temperature and pressure. However, in some instances, the user may want to recharge a refrigerant system 124 without having run the recovery routine immediately prior to running the charge routine, or when the unit may have been turned off and unused for an extended period of time. In these circumstances, according to embodiments of the invention, the refrigerant in the main tank 12 may need to be conditioned or heated. The unit can be programmed to determine whether conditioning of the refrigerant is required, which saves time by eliminating this step when it is not needed. Heating the refrigerant all of the time could result in elevated tank temperatures and pressures at times when it is not advantageous. An example of this would be during the recovery process, where excess tank heat and pressure would slow down the process. By conditioning only when required, the unit can operate as fast as possible, thereby saving both time and costs.

According to embodiments of the invention, ways to determine if the refrigerant in the main tank 12 needs to be conditioned include: recording whether or not a recovery process was run since the unit was switched on; measuring the time that has elapsed since the last time a recovery process was run; and measuring the temperature of the main tank 12 and comparing that temperature to the ambient temperature. If it determined that conditioning of the refrigerant is required, then heat is imparted to the refrigerant in the main tank 12. Examples of ways to impart heat to the refrigerant include: running the refrigerant through the recycling process in the unit especially through the compressor; or using an external or internal electric heat source, such as an electric heater blanket wrapped around the main tank 12. Both the compressor and the electric heat source are heating devices. Other methods to add heat to the refrigerant are also possible, in accordance with the principles of the invention, including using an internal heat source located inside the main tank 12.

Figure 6:
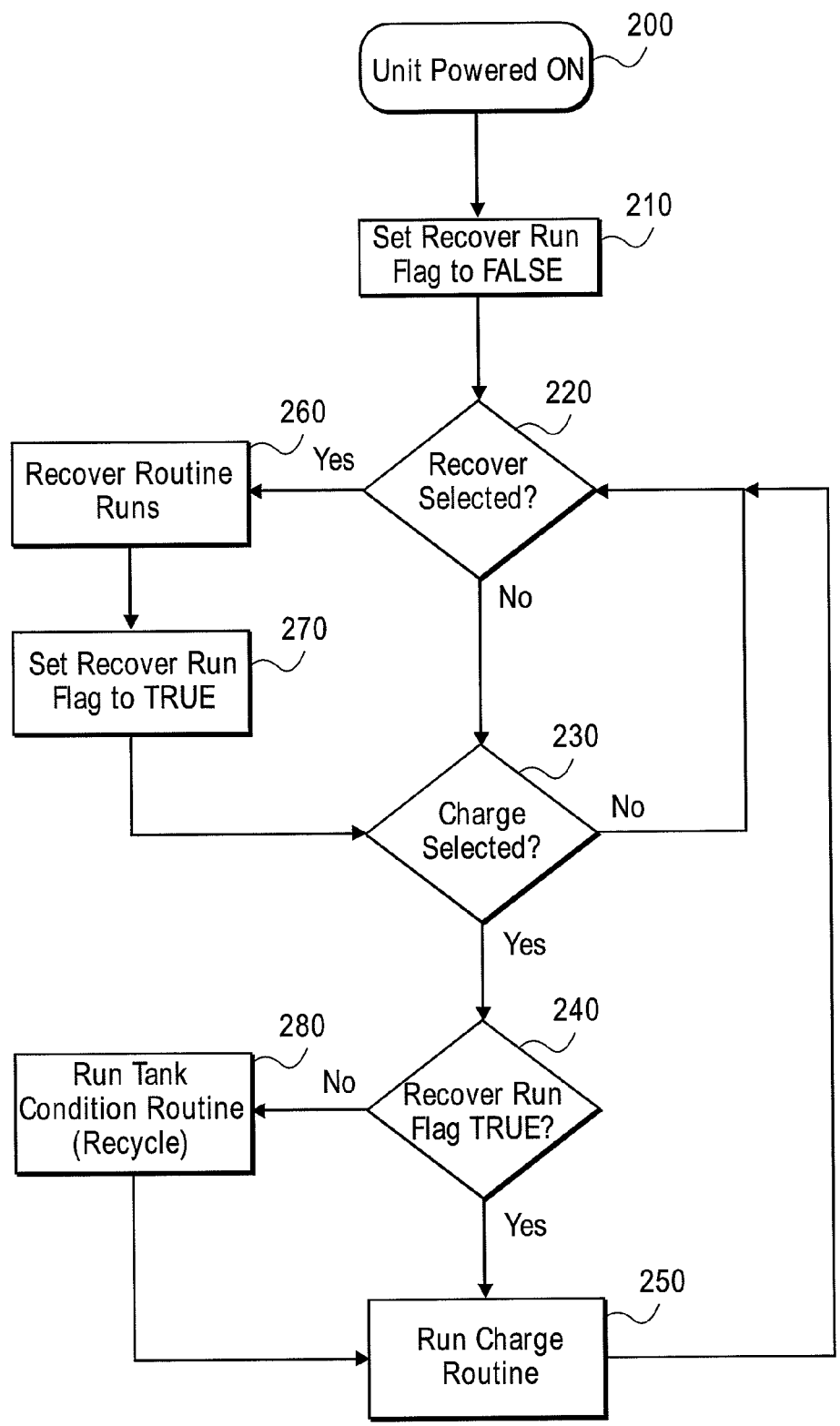
FIG. 6 is a flow chart illustrating an example of operations that may be performed by a refrigerant recovery unit according to the invention.

According to an example embodiment of a method for accurately filling a refrigerant system utilizing a supply of refrigerant in a storage vessel of a refrigerant recovery unit, the program begins with powering the refrigerant recovery unit 10 on, as indicated by block 200 shown in FIG. 6. Then, the program sets a flag to FALSE to indicate that a recover routine has not been run since the unit was powered on, as indicated by block 210. Next, the unit determines if a recover routine has been selected by the operator, as indicated by block 220. If a recover routine has not been selected by an operator, the program then determines if a charge routine has been selected, as indicated by block 230.

If, however, a recover routine has been selected, the program then initiates the recover routine, as indicated by block 260. The program then turns off the FALSE flag and turns on a TRUE flag to indicate that the recover routine has run, as indicated by block 270. Then, the program determines if a charge routine has been selected, as indicated by block 230. If a charging process has not been selected, the program then returns to block 220 to determine if a recovery process has been selected.

If, however, a charge routine has been selected, the program then determines if the recovery run flag is set to TRUE, as indicated by block 240. If the flag is TRUE, the program then skips a conditioning routine and directly executes a charge routine, as indicated by block 250. The process of determining the condition or state of refrigerant in the main tank 12 using flags is a means for determining a condition of the refrigerant. If the flag is set to FALSE or "No" meaning that a recover routine has not been performed since the unit 10 has been switched on, the program then executes a conditioning routine to heat the refrigerant in the main tank 12 using a heating device 146, shown in FIGS. 4 and 5, as indicated by block 280. Then, the program executes the charge routine, as indicated by block 250. This example embodiment requires the least amount of hardware and sensors than the other example embodiments described below. After the charge routine 250 is executed, the program returns to the block 220 to wait for an operator input to determine whether a recover routine is selected.

Figure 7:
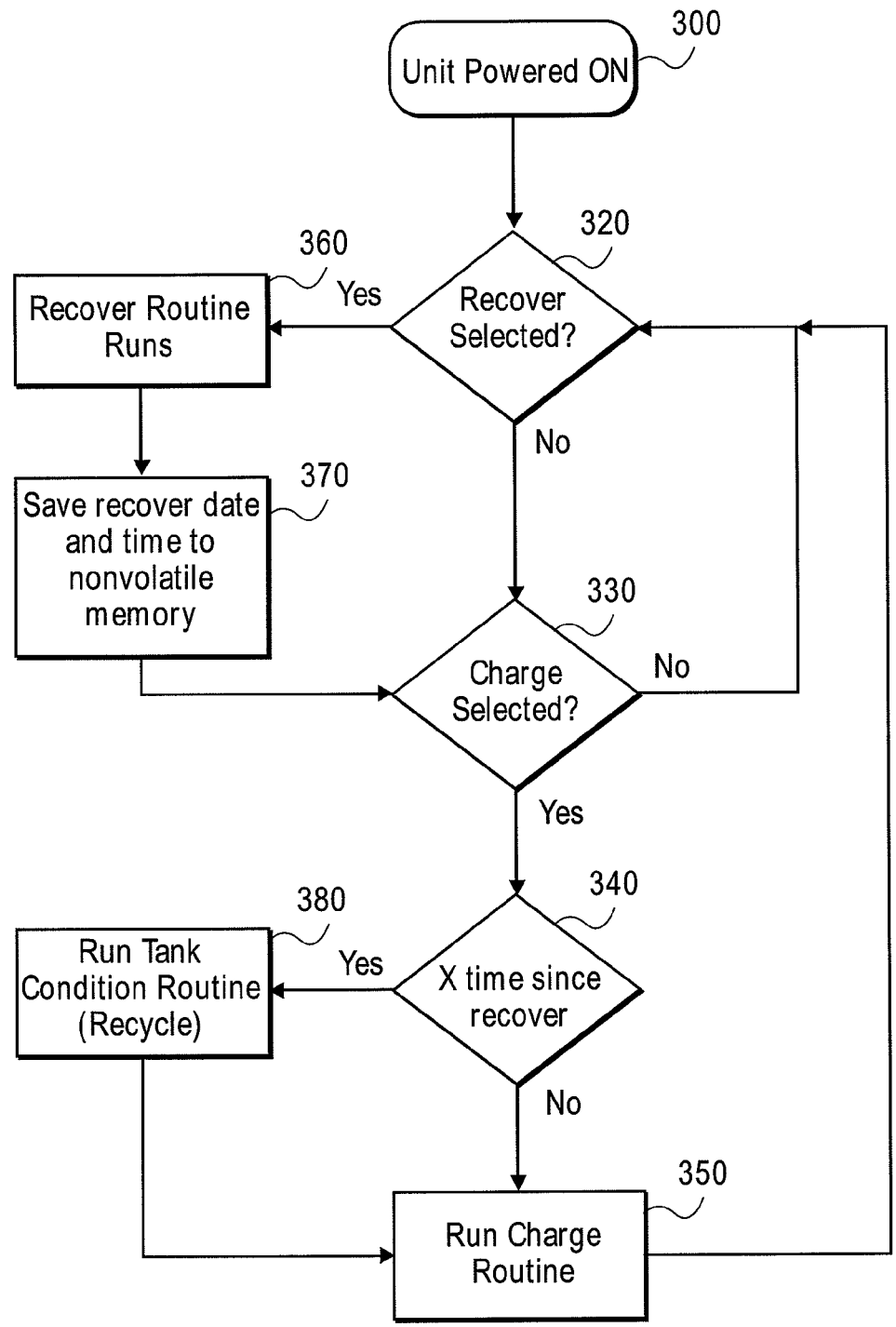
FIG. 7 is a flow chart illustrating another example of operations that may be performed by a refrigerant recovery unit according to the invention.

According to another example embodiment of a method for accurately filling a refrigerant system, the program begins with powering the refrigerant recovery unit 10 on, as indicated by block 300 shown in FIG. 7. Next, the program determines if a recover routine has been selected by the operator, as indicated by block 320. If a recover routine has not been selected by an operator, the program then determines if a charge routine has been selected, as indicated by block 330. If, however, a recover routine has been selected, the program then initiates the recover routine, as indicated by block 360. In this example embodiment, the program then records the date of time the recover routine was performed to a memory, as indicated by block 370, which may be a nonvolatile memory. Then, the program determines if a charge routine has been selected by the operator, as indicated by block 330. If a charge routine has not been selected, the program then returns to block 320 to determine if a recover routine has been selected.

If, however, a charge routine has been selected, the program then determines the amount of time that has passed since the recover routine was performed by accessing the recorded time and date of the last recovery from memory. This program would work on machines that have a real time clock and would have the advantage of not reconditioning every time the power to the unit 10 is turned on. The program would only run a conditioning routine when a predetermined amount of time has passed since the last recovery. If a predetermined amount of time has not elapsed, as indicated by block 340, then the program skips the condition routine and directly executes the charge routine, as indicated by block 350. After the charge routine is executed, the program returns to the block 320 to wait for an operator input to determine whether a recover routine is selected.

If, however, the elapsed time meets or exceeds the predetermined amount of time, then the program executes the condition routine to heat the refrigerant in the main tank 12 with the heating device 146, shown in FIGS. 4 and 5, as indicated by block 380. Then, the program executes the charge routine, as indicated by block 350. Utilizing a clock to determine the condition or state of refrigerant in the main tank 12 is an example of a means for determining a condition of the refrigerant.

Figure 8:
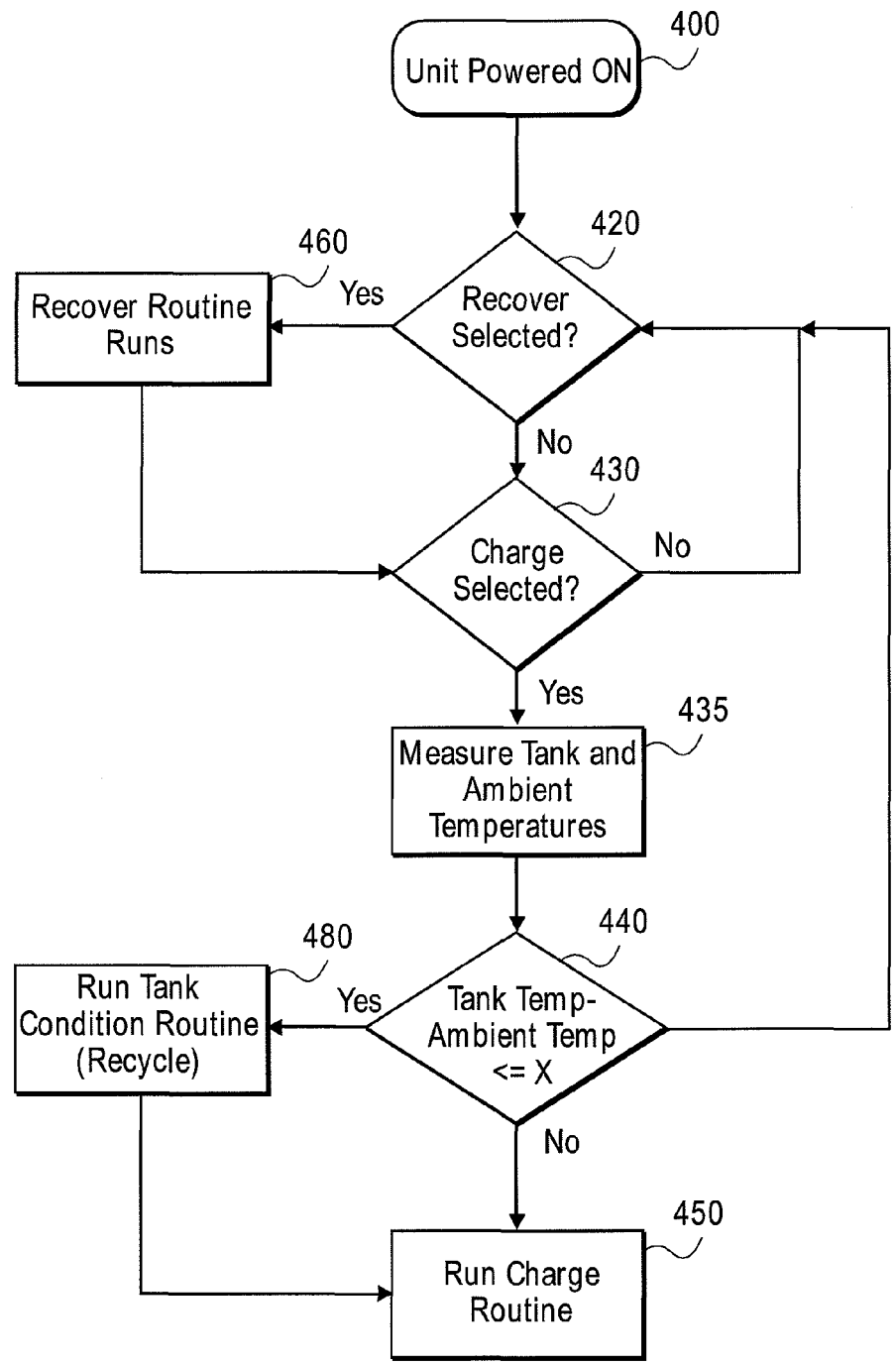
FIG. 8 is a flow chart illustrating yet another example of operations that may be performed by a refrigerant recovery unit according to the invention.

According to still another example embodiment of a method for accurately filling a refrigerant system, the program begins with powering the refrigerant recovery unit 10 on, as indicated by block 400 shown in FIG. 8. Next, the program determines if a recover routine has been selected by the operator, as indicated by block 420. If a recover routine has not been selected by an operator, the program then determines if a charge routine has been selected, as indicated by block 430. If, however, a recover routine has been selected, the program then initiates a recover routine, as indicated by block 460. Then, the program determines if a charge routine has been selected by the operator, as indicated by block 430.

If a charge routine has not been selected, the program then returns to block 420 to determine if a recover routine has been selected. If a charge routine has been selected, the program then receives temperature data from a temperature sensor 148, as shown in FIG. 4, which senses the ambient temperature, and the refrigerant temperature in the main tank 12. The temperature sensor 148, which senses both the ambient temperature and the refrigerant temperature, may be one sensor coupled to the main tank 12 and in data communication with the controller 16. Utilizing the temperature sensor 148 to determine the condition or state of refrigerant in the main tank 12 is an example of a means for determining a condition of the refrigerant. Optionally, there may be two separate temperature sensors both arranged in data communication with the controller 16. One sensor would sense the ambient temperature, and the other sensor would be coupled to the main tank 12 to sense the refrigerant temperature.

Next, the controller determines the temperature difference between the ambient temperature and the refrigerant temperature, as indicated by block 440. The controller compares the temperature difference to a predetermined temperature difference. The predetermined temperature difference may be set to an optimum temperature difference, although that is not required. It is to be understood that the predetermined temperature difference may be any level of temperature difference that is consistent with the principles of the invention, for example, a temperature difference of 25° F. If the calculated temperature differential is less than 25 degrees, then conditioning is needed. The program then executes the condition routine to heat the refrigerant in the main tank 12 with a heating device 146, as shown in FIGS. 4 and 5 and as indicated by block 480. Then, the program runs the charge routine, as indicated by block 450. If, however, the calculated temperature difference is more than the predetermined value, then the program executes the charge routine, as indicated by block 450. The condition routine is skipped, as this would be an indication that the refrigerant temperature in the main tank 12 is already sufficiently elevated and that additional conditioning is not required. After the charge routine is executed, the program returns to the block 420 to wait for an operator input to determine whether a recover routine is selected.

Optionally, or in addition to, the program could be configured at block 440 to calculate a pressure difference. Specifically, the controller 16 may be configured to receive temperature data from a temperature sensor 152, as shown in FIG. 5, which senses the ambient temperature. The temperature data may then be converted to a calculated refrigerant pressure using a pressure-temperature curve or "PT" curve for the given refrigerant. In addition, a pressure sensor 150 coupled to the main tank 12 may be configured to sense the actual pressure of the refrigerant in the main tank 12, and then send that pressure data to the microprocessor. Utilizing the temperature sensor 152 and/or the pressure sensor 150 to determine the condition or state of refrigerant in the main tank 12 is another example of a means for determining a condition of the refrigerant. The microprocessor would then determine the pressure difference between the measured refrigerant pressure and the calculated refrigerant pressure. The controller compares the pressure difference to a predetermined pressure difference. The predetermined pressure difference may be set to an optimum pressure difference, although that is not required. It is to be understood that the predetermined pressure difference may be any level of pressure difference that is consistent with the principles of the invention, for example, a pressure difference of at least 5 psi. If the calculated pressure difference is less than or equal to the predetermined pressure difference, then the program would run the condition routine at block 480. If, however, the calculated pressure difference is greater than the predetermined pressure difference, then the condition routine is skipped, as this would be an indication that the refrigerant temperature in the main tank 12 is already sufficiently elevated and that additional conditioning is not required. Finally, the program would execute the charge routine, as indicated at block 450. After the charge routine is executed, the program returns to the block 420 to wait for an operator input to determine whether a recover routine is selected.

Thus, with the methods of the present invention, refrigerant in the main tank 12 is only conditioned when required, thereby ensuring a consistent pressure differential between the refrigerant in the main tank 12 and the refrigerant system 124 to be charged. The consistent pressure differential permits the flow of refrigerant from the main tank 12 to the refrigerant system 124 to flow at a consistent and predictable rate allowing for greater charge accuracy, in terms of how much refrigerant by weight is added to the refrigerant system 124.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for accurately filling a refrigerant system utilizing a supply of refrigerant in a storage vessel of a refrigerant recovery unit, said method comprising:
   determining, via a controller, when the refrigerant recovery unit was turned on;
   determining, via the controller, if refrigerant from the refrigerant system has been recovered since the refrigerant recovery unit was turned on; and
   heating the refrigerant in the storage vessel if refrigerant has not been recovered from the refrigerant system since the refrigerant recovery unit was turned on and a charge routine has been selected.

2. The method according to claim 1, further comprising transferring refrigerant from the storage vessel to the refrigerant system if refrigerant has been recovered from the refrigerant system since the refrigerant recovery unit was turned on.

3. A method for accurately filling a refrigerant system utilizing a supply of refrigerant in a storage vessel of a refrigerant recovery unit, said method comprising:
   receiving signals at a controller in response to a recovery routine being selected, the controller being operatively connected to the refrigerant recovery unit; and
   performing a conditioning routine in response to the controller determining that the recovery routine has not been performed since the refrigerant recovery unit was turned on and a charge routine was selected.

4. The method according to claim 3, further comprising:
   accessing a memory by the controller; and
   determining that the recovery routine has not been performed since the refrigerant recovery unit was turned on based upon a recorded time when a previous recovery routine was performed.

5. The method according to claim 1, further comprising:
   transferring refrigerant from the storage vessel to the refrigerant system in response to the controller determining the refrigerant has been recovered from the refrigerant system since the refrigerant recovery unit was turned on.

* * * * *